SIGNAL REPRODUCING SYSTEM WITH PHASE CANCELLATION OF UNDESIRED SIGNAL COMPONENT

Filed March 19, 1962 2 Sheets-Sheet 1

ALLEN J. TROST &
ERHARD K. KIETZ
INVENTOR.

BY Nathan N. Kallman

ATTORNEY

ALLEN J. TROST &
ERHARD K. KIETZ
INVENTORS

BY Nathan N. Kallman
ATTORNEY 3,204,047
Patented Aug. 31, 1965

3,204,047

SIGNAL REPRODUCING SYSTEM WITH PHASE CANCELLATION OF UNDESIRED SIGNAL COMPONENT

Allen J. Trost, Santa Clara, and Erhard K. Kietz, Menlo Park, Calif., assignors to Ampex Corporation, Redwood City, Calif., a corporation of California Filed Mar. 19, 1962, Ser. No. 180,617
6 Claims. (Cl. 179—100.2)

Figure 1:
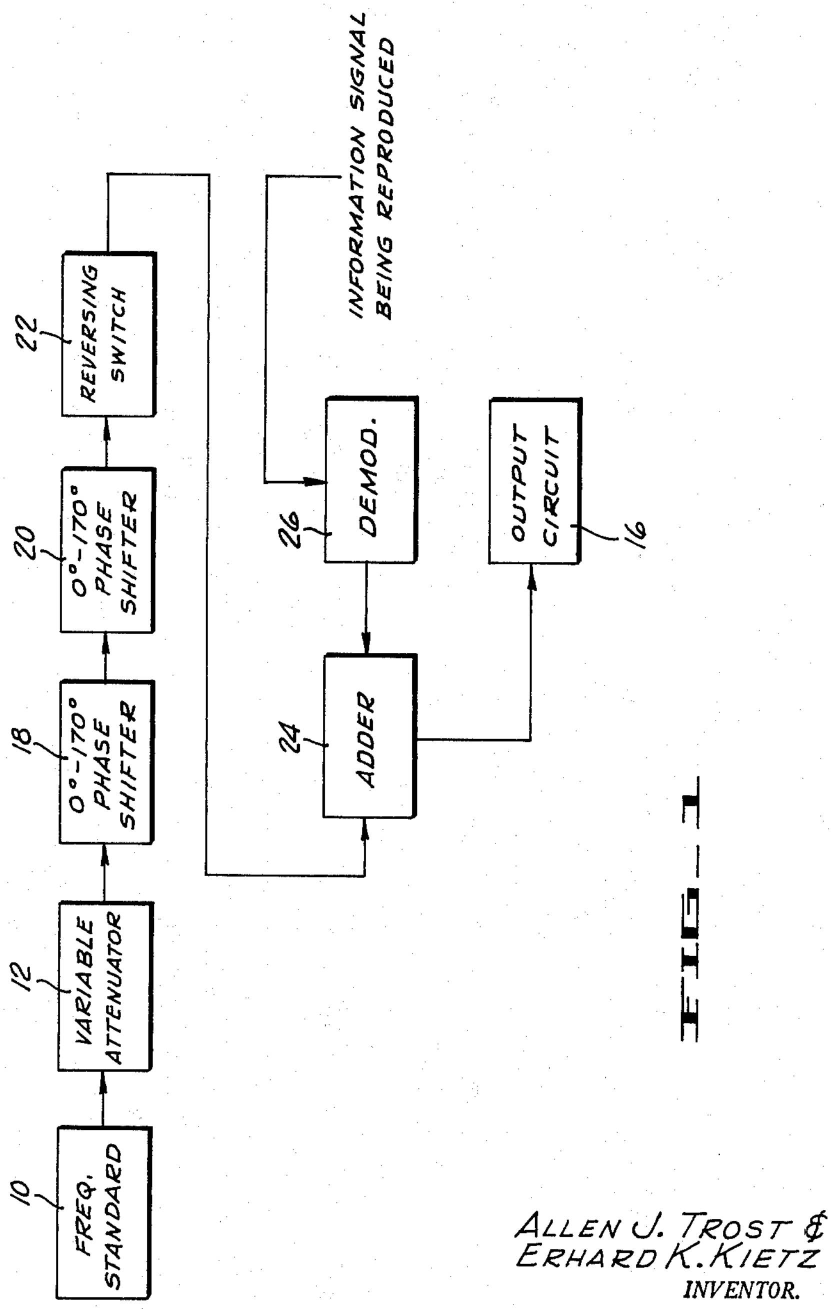

This invention relates to magnetic tape recording, and particularly to a method for providing compensation for an interference signal developed in a magnetic tape apparatus that employs a pilot signal for time base correction of a data signal being reproduced.

In one type of advanced magnetic tape apparatus, a pilot signal is recorded together with the information signal. The nonlinear characteristics of the magnetic heads and tape produce cross modulation components of both these signals. For example, in the magnetic tape apparatus such as described in patent application S.N. 137,368 entitled "Magnetic Recording and Reproducing System," filed on September 11, 1961, in behalf of E. K. Kietz et al. and assigned to the same assignee, information is recorded in the form of a frequency modulated carrier. The pilot signal is a continuous sine wave derived from a frequency standard and added to the frequency-modulated wave before the recording process. If $f$ denotes the information carrier and F the pilot frequency, the cross modulation components $f-F$ and $f+F$ are produced by the nonlinear head-tape characteristics. These components fall within the passband of the frequency-modulated information signal. However, if the reproduced signal passes the FM-discriminator (demodulator), an unwanted component F appears in the information signal as an interference signal.

In the system described in the aforementioned patent application, the reproduced signal is time-base corrected to a high degree before demodulation takes place. Therefore, the spurious pilot component in the demodulated information signal is very constant, and can be substantially cancelled by adding to the demodulated signal a continuous wave of the same frequency and amplitude, and of opposite phase with respect to the interference component. This cancellation signal can be derived from the timing reference (master clock) of the system.

An object of this invention is to provide a method for substantially minimizing an interference signal caused by cross modulation between a pilot frequency and a frequency-modulated wave in an information signal reproduced from magnetic tape after time base correction has been performed.

According to this invention, a signal interference compensating method in a magnetic tape apparatus that employs a pilot signal that is recorded with a frequency modulated information signal comprises the steps of providing a compensating signal of the same frequency as the interference signal, adjusting the amplitude of the compensating signal to that of the interference signal with a variable attenuator, and shifting the phase of the attenuated compensating signal through at least a 360° range by means of a variable phase shift means. The cancellation or compensating signal is added to the demodulated information signal, and adjustments of the variable attenuator and phase shift means are made until the interference signal is practically eliminated from the demodulated signal. This may be achieved by observing a representation of the demodulated signal that contains the interference signal on an oscilloscope or other electrical or visual measuring means, while making the adjustments.

Figure 2:
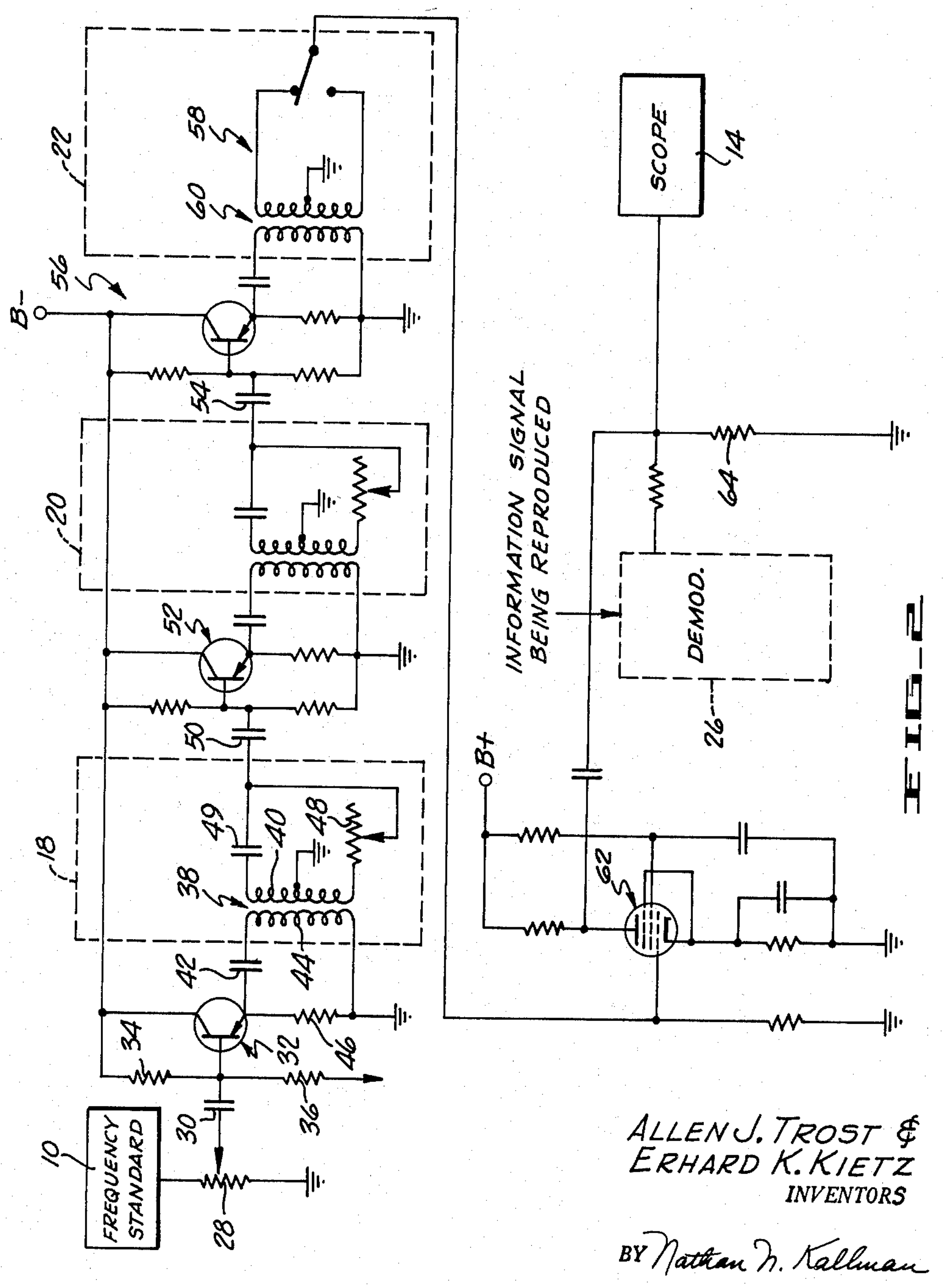

The invention will be described in greater detail with reference to the drawing, in which:

FIGURE 1 is a block diagram of a signal interference compensating circuit that may be used to carry out this invention; and FIGURE 2 is a schematic circuit diagram of the circuit of FIGURE 1.

In FIGURE 1 a frequency standard 10 supplies a compensating signal, which may be a 500 kilocycle signal for example, such as employed as a pilot signal in a magnetic tape apparatus of the type described in the aforementioned U.S. patent application Serial No. 137,368. The compensating signal is applied to a variable attenuator 12 that serves to adjust the amplitude of the signal to match that of the interference signal. The interference signal may be viewed on an oscilloscope 14 (shown in FIGURE 2). The attenuated compensating signal is then channeled through a pair of RC phase shifters 18 and 20, each of which can provide a partial phase shift, that is from zero to 170°. The phase shifters 18 and 20 together do not provide a phase shift over an entire range, that is from zero to 360°, which would be necessary to match the cancellation signal to any possible phase condition of the interference signal.

Therefore, the cancellation signal derived from phase shifter 20 is directed to a reversing switch 22 that produces either a zero or 180° phase shift, so that in combination with the zero to 170° adjustments of phase shifters 18 and 20, any degree of phase shift may be achieved. The cancellation signal is then applied to an adder 24, which also receives the demodulated information signal containing the interference signal component from a demodulator 26. The added information and compensating signals are supplied to the output circuit 16.

When a suitable cancellation signal has been established so that it is in antiphase to the interference signal and of the same amplitude, the spurious interference signal components are substantially eliminated and only the information signal remains to be further processed for utilization.

In FIGURE 2, the schematic circuit diagram details the elements for the several blocks shown in FIGURE 1. The frequency standard 10, which may be a crystal oscillator, feeds a sinusoidal signal of known frequency through a variable resistor 28 and a coupling capacitor 30, to the base of a transistor emitter follower 32. A pair of resistors 34 and 36 provides the proper base bias for the transistor 32, which presents a low impedance to the phase shifter 18 that includes a transformer 38. The primary winding 44 of the transformer 38 is connected to the emitter follower output across a blocking capacitor 42.

The sinusoidal signal is applied to the primary 44, and the output of the transformer 40 is a push-pull signal voltage that may be phase shifted to a degree controlled by a variable resistor 48 coupled to the secondary 40 of the transformer 38. The phase of the output voltage is related to the values of the variable resistance 48 and the capacitor 49 (the RC circuit) linked to the secondary 40. The signal from this RC phase shifter 18 is then passed through a coupling capacitor 50 and a transistor emitter follower 52 to the second similar RC phase shifter 20 that also provides a phase shift ranging between zero and 170°. The attenuated and phase shifted signal is then passed through a coupling capacitor 54 and emitter follower stage 56 to a reversing switch 58 that can be switched to either side of a center tapped transformer 60 thereby being capable of providing a phase reversal which is identical with a phase change of 180°. The sinusoidal signal from the reversing switch 58 is then applied to the control grid of a pentode amplifier 62.

Simultaneously, the information signal that is being reproduced is derived from the demodulator 26 and directed to an impedance 64, which may be 75 ohms, that is tied to ground. The sinusoidal signal to be used for cancellation is also applied to the load impedance 64, from the pentode 62, which presents a high impedance to the output circuit. Both the information and cancellation signals are supplied to an oscilloscope 14 connected to the load 64 at the output of the magnetic tape reproducing system, for viewing and adjustment by the operator. By adjusting the variable resistances of the phase shifters 18 and 20, and if necessary the reversing switch 22, the cancellation signal may be brought into antiphase with the interference signal thereby eliminating such interference from the demodulated signal.

The circuit set forth above affords a simple convenient means for suppression of interference signals. It is to be understood that various modifications of this circuit may be made within the scope of this invention. For example, the phase shift means may comprise variable delay lines providing a delay adjustable between zero and one full cycle of the pilot frequency. Furthermore, indicating means other than the oscilloscope may be utilized to display the interference signal that is to be cancelled.

What is claimed is:

1. A method for providing compensation of an interference signal developed in a magnetic tape apparatus that employs a pilot signal having a fixed frequency for time base correction of a data signal that has been demodulated and is being reproduced comprising the steps of:

supplying a sine wave signal having a fixed frequency the same as that of the pilot signal;
controlling the amplitude of such fixed frequency signal by means of a variable attenuator;
providing a phase shift to such fixed frequency signal by a variable phase shift means capable of providing a total phase shift exceeding 360 degrees; and
adding such attenuated and phase shifted signal to the data signal that is being reproduced to cancel undesirable interference signals.

2. A method for providing compensation of an interference signal developed in a magnetic tape apparatus that employs a pilot signal having a fixed frequency for time base correction of a data signal that has been demodulated and is being reproduced comprising the steps of:

supplying a sine wave signal having a fixed frequency the same as that of the pilot signal;
controlling the amplitude of such fixed frequency signal by means of a variable attenuator;
providing a phase shift to such fixed frequency signal by means of a variable phase shift means including variable resistances and center-tapped transformers capable of providing a total phase shift substantially greater than 360°, such phase shifting step including the step of adjusting such variable resistances; and
adding such attenuated and phase shifted signal to the data signal that is being reproduced to cancel undesirable interference signals.

3. A method for providing compensation of an interference signal developed in a magnetic tape apparatus that employs a pilot signal having a fixed frequency for time base correction of a data signal that has been demoduated and is being reproduced comprising the steps of:

supplying a sine wave signal having a fixed frequency the same as that of the pilot signal from a frequency standard;
controlling the amplitude of such fixed frequency signal by means of a variable attenuator;
supplying a phase shift of such frequency signal of less than 180° with a first phase shift device; supplying a further phase shift of such frequency signal of less than 180° with a second phase shift device;
supplying a 180° phase shift to such signal by means of a reversing switch; and
adding such attenuated and phase shifted signal to the data signal that is being reproduced.

4. A method for providing compensation of an interference signal developed in a magnetic tape apparatus that employs a pilot signal having a fixed frequency for time base correction of a data signal that has been demodulated and is being reproduced comprising the steps of:

supplying a sinusoidal signal having a fixed frequency the same as that of the pilot signal from a frequency standard;
adjusting the amplitude of such fixed frequency signal by means of a variable attenuator;
supplying a first phase shift of such frequency signal no greater than 170° by means of a first phase shift device;
reversing a switch for supplying a 180° phase shift of such signal so that a total phase shift up to and greater than 360° is provided; and
adding such attenuated and phase shifted signal to the data signal that is being reproduced.

5. A method for providing compensation of an interference signal developed in a magnetic tape apparatus that employs a pilot signal having a fixed frequency for time base correction of a data signal that has been demodulated and is being reproduced comprising the steps of:

supplying a sinusoidal signal having a fixed frequency from a frequency the same as that of the pilot signal standard;
controlling the amplitude of such fixed frequency signal by means of a variable attenuator;
supplying a phase shift of such frequency signal with a first phase shift device;
supplying a further phase shift of such frequency signal with a second phase shift device;
reversing a switch for supplying a 180° phase shift to such signal, such phase shift devices and switch providing a total phase shift up to and greater than 360°; and
adding such attenuated and phase shifted signal to the data signal that is being reproduced to cancel the interference signal.

6. A method for providing compensation of an interference signal devolped in a magnetic tape apparatus that employs a pilot signal having a fixed frequency for time base correction of a data signal that has been demodulated and is being reproduced comprising the steps of:

supplying a signal having a fixed frequency the same as that of the pilot signal from a frequency standard;
adjusting the amplitude of such fixed frequency signal by means of a variable attenuator;
supplying a phase shift to such frequency signal of less than 180° including the step of varying a resistance;
supplying a further phase shift of such frequency signal of less than 180° including the step of varying a resistance;
reversing a switch for supplying a 180° phase shift to such signal; and
adding such attenuated and phase shifted signal to the data signal that is being reproduced.

References Cited by the Examiner

UNITED STATES PATENTS

| | | | |
|---|---|---|---|
| 2,113,212 | 4/38 | Landon | 325—476 |
| 2,371,416 | 3/45 | Tunick | 325—476 |

DAVID G. REDINBAUGH, *Primary Examiner.*

ROY LAKE, *Examiner.*